TAMPER INDICATING CASING FOR LOCKS

Filed March 8, 1962 2 Sheets-Sheet 1

INVENTOR
H. KNOX BRYSON
GEORGE F. MUNNS

BY Milford A. Juten

ATTORNEY

Oct. 5, 1965 H. K. BRYSON ETAL 3,209,569

TAMPER INDICATING CASING FOR LOCKS

Filed March 8, 1962 2 Sheets-Sheet 2

INVENTOR
H. KNOX BRYSON
GEORGE F. MUNNS

BY [signature]

ATTORNEY

United States Patent Office 3,209,569
Patented Oct. 5, 1965

3,209,569

TAMPER INDICATING CASING FOR LOCKS

Henry Knox Bryson, Great Falls, and George F. Munns, Arlington County, Va., assignors of twenty-five percent to Milford A. Juten Filed Mar. 8, 1962, Ser. No. 178,342
7 Claims. (Cl. 70—440)

The present invention relates to security and more particularly to maintaining control of equipment including safes, locks, message sending and receiving equipment such as telephones or the like so that persons responsible for security of messages and of documents or other valuable material will have actual knowledge of whether access has been had to the equipment, locks and the contents of any compartment by the use of a sealing device which covers the controls of equipment or the lock operating structure so that any access obtained to the equipment or lock will be known upon inspection by the responsible person.

Heretofore attempts have been made to provide seal locking structure so that access would be observed by persons in positions of responsibility who would have knowledge of such access and so be able to fix responsibility. Particularly in the safe keeping of equipment and secret papers and even where guards are on duty continually, unaccounted losses have occurred and therefore the prior solutions to the problem have not been satisfactory.

One object of the present invention is to provide a seal arrangement which overcomes these difficulties and would positively indicate when any access to equipment or locks has occurred.

An object of the invention is to provide sealing structure to overcome the deficiencies of the prior art.

An object of the present invention is to providing a sealing device which is adaptable to existing locks particularly combination locks to prevent unauthorized access to the dial and to indicate any access so that responsibility can be fixed.

A further object is to provide a lock operating structure which is complete with a series of sealing disks of a definite predetermined pattern usable with the sealing casing of the present invention, for a fixed period, to assure that the lock is opened only at the stipulated times and any opening at other times will be clearly apparent and can be accounted for.

Another object of the present invention is to provide a sealing casing for covering a lock operating structure which is of general utility and can be applied to a large number of existing locks with a minimum of alteration of the lock.

Other and further objects will be apparent as the description proceeds and upon reference to the accompanying drawing wherein.

Figure 1:
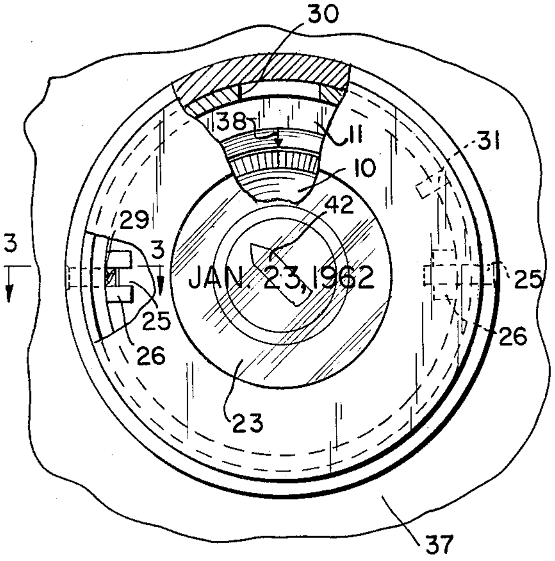
FIG. 1 is a front elevation of a combination lock with the dial and face plate within the sealing casing structure of the present invention showing the portion of the dial and index lock retaining flange and the releasable latches for holding the housings in assembled relation with parts of the housing broken away to show the structure.

Briefly the sealing casing of the present invention includes a first housing mounted by means of the usual mounting structure for operating a lock, a second housing, and rupturable sealing disk for assembly with the first and second housings to form a complete casing completely enclosing the lock operating structure so that access to such lock operating structure can be only obtained by breaking the seal so that observers of the casing and/or seal will immediately know that access has been obtained to the lock operating structure. The structure includes a supply of sealing disks indexed to a particular pair of housings so that only the correct sealing disks can be used and therefore the responsible person can issue the proper sealing disks for a given period and if it is necessary to have other seals used the responsible person will know of the access which has been had and by whom.

Upon more detailed reference to the drawing the sealing casing is shown enclosing an operating dial 10 of a combination lock and its cooperating face and index plate 11 and includes a first hollow cylindrical housing 12 including hollow cylinder 14 closed by plate 13 at one end thereof integral therewith. A circumferentially extending rim 15 spaced from the cylinder 14 and attached to the plate 13 provides a groove between the hollow cylinder 14 and the rim 15 for receiving the edge of the completely open end of a second hollow cylindrical housing 16 which telescopes on cylindrical housing 12. The second cylindrical housing has a hollow cylinder 17 with an external rib 18 intermediate its ends and an inwardly extending flange 19 on its outer end with a circumferential rib 20 on the inner side of the flange 19.

Figure 2:
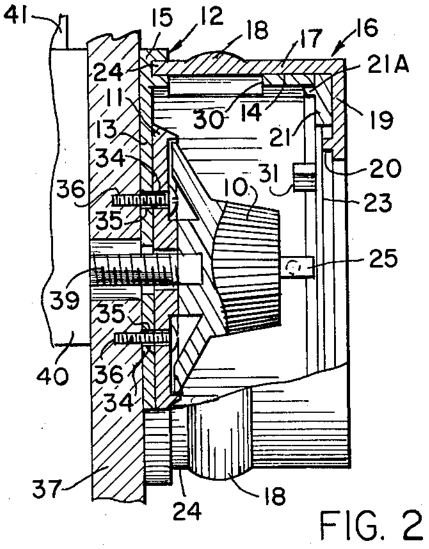
FIG. 2 is a partial vertical section taken generally through the center of the sealing casing and combination lock dial and index face plate showing the observation opening and the latch structure in the one housing as well as one of the positioning lugs to prevent improper assembly and assuring that only the proper sealing disks are used.
Figures 3, 4:
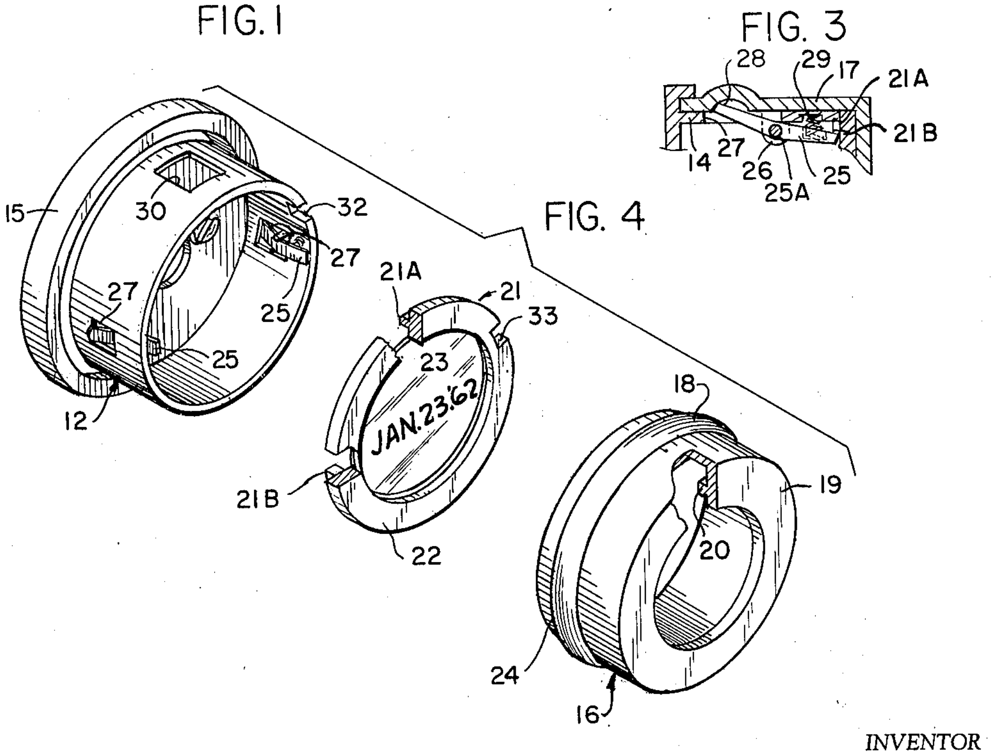
FIG. 3 is a fragmentary section taken on line 3—3 of FIG. 1 showing one of the releasable latches for securing the housings together forming the sealing casing and illustrating how the rib of the sealing disk is formed to prevent using a spurious disk in the casing.
FIG. 4 is an exploded isometric view of the parts of the casing showing the parts prior to assembly with portions broken away to show the indexing lugs and notches.

The two housings telescope together into assembled relation shown in FIGS. 1 and 2 and retain a sealing disk 21 having a rim 22 and a rupturable stressed membrane 23 held in the rim 22. The rim 22 of the sealing disk 21 is provided with a circumferential rib 21A on its inner face and spaced from the periphery the thickness of cylinder 14 for reception within the open end of the first cylinder 14. The rib 20 on the inner surface of flange 19 bears against the outer surface of the rupturable membrane 23 to additionally stress the membrane the desired amount. In assembled relation the parts provide a neat appearance showing the parts are properly assembled, a line 24 being provided on the outer cylinder in a position to be hidden beneath the rim 15 only when the parts are in operative locked assembled relation shown.

A pair of releasable latch levers 25 pivoted intermediate their ends on pivot pins 25A supported on lugs 26 on the inner periphery of inner cylinder 14 have one end projecting outwardly of the inner cylinder 14 through openings 27 into retaining engagement with registering keeper recesses 28 opening to the inner surface of outer cylinder 17 beneath the external rib 18, being maintained in operative relation to retain the cylindrical housings in assembled position by the action of compression springs 29 received in spring retaining recesses in cylinder 14 and the outer ends of latches 25 to urge the latch end of the latch levers 25 into latching relation to keeper recesses 28 thereby maintaining the latches in operative position preventing separation of the cylindrical housing 16 from the cylindrical housing 12.

The latches can be operated only from within the sealing casing after the membrane 23 is broken and the latches 25 are simultaneously operated by engagement with two fingers of opposite hands of the person seeking access to the combination operating dial.

After the latches are released the person operating such latches can pull on the rim 22 of sealing disk 21 or on the flange 19 of outer cylinder 17 and separate the outer from the inner cylinder so the open end of the inner cylinder 14 is unobstructed for operation of the combination dial.

To provide for reading the graduation indicia on combination dial 10, the opaque inner cylinder 14 is provided with a viewing aperture 30 which provides for observation of the graduations of the combination dial 10 and the index mark on the index and face plate 11.

To assure that the opaque outer cylinder 16 is properly positioned on the inner cylinder 14, an axially extending lug 31 is provided on the inner periphery surface of the outer cylinder 16 and is received in a cooperating slot 32 in the open end of the inner cylinder 14. The outer periphery of the sealing disk 21 is provided with a registering notch 33 which also receives and engages the lug 31. The rib 21A on sealing disk 21 must also be provided with slots 21B for receiving the outer ends of the latches 25. It will be apparent that other lugs can be provided to provide a combination so that only a properly notched sealing disk can be inserted in place. The latches can be positioned in slightly different positions so the proper combination of slots 21B in the rib 21A must be provided for operation of the sealing casing. The rib 21A can be made of greater radial dimension so that the outer end of the latches must be received in such latch receiving slots 21B thereof before the parts can be assembled.

The combination lock shown is of the type manufactured by Sargent Greenleaf, Rochester, New York and includes an indexing and mounting face plate 11 having mounting screw receiving circumferentially extending slots 34 registering with corresponding slots 35 in the closed end of the first housing 12. Mounting screws 36 pass through such slots 34 and 35 and secure the mounting face and index plate 11 on a safe door 37 thereby securing the combination lock operating dial and mounting face and index plate in operative position and also securing the first housing 12 in fixed position on the door.

The dial 10 has the usual graduations which can be aligned with the index mark 38 to provide for the accurate operation of the dial in working the combination. The dial is supported on a threaded shaft 39 that extends into lock mecanism in casing 40 which has a latch bolt 41 controlled by the combination lock mechanism in the casing 40 and by the operating arrow 42 in the center of the dial in a known manner.

The inner housing 12 is made of a suitable material such as a plastic which provides sufficient strength and assures sufficient strength to perform its function and is preferably opaque. The outer housing 16 is made of a material which will disintegrate upon receiving force which causes damage thereto and is preferably of opaque tempered glass of a type that upon being struck with sufficient force to cause a crack will cause the housing to completely disintegrate. The type of glass known as case hardened glass will cause complete disintegration upon being damaged in any manner thereby causing an observer to know that the sealing unit had been tampered with.

The latch structure may comprise other types of latches in lieu of the pivoted latches shown, and the latches are made of non-magnetic material to prevent operation by magnetic force applied through the casing.

The sealing membrane 23 is preferably made of transparent material so that the latches can be observed to make sure that each latch 25 is properly engaging with its latch receiving keeper recess 28.

Figure 5:
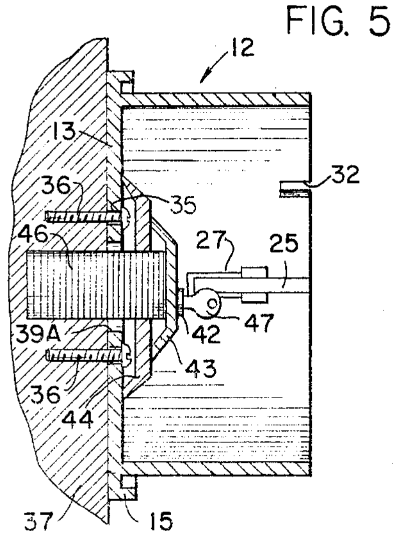
FIG. 5 is a sectional view similar to FIG. 2 showing the first housing element mounted over a key operated cylinder lock showing the flange of the lock retaining a mounting face plate which retains the first housing section in position.

In FIG. 5 the first housing element 12 is used with a cylinder tumbler type lock 46 passing through opening 39A and key 47 operating the key plug 42 in a known manner. The conventional outer flange 43 of the cylinder 46 engages a mounting face plate 44 which engages the inner surface of the closed end 13 of the first housing 12 to retain the first housing in operative position. To additionally secure the first housing in place and prevent rotation of the first housing the mounting screws 36 pass through openings 35 and are threaded into door 37 to retain the housing in the manner previously described. Additional fastening means (not shown) are provided in snug fitting apertures to prevent any rotation or displacement.

It will be apparent that the second housing element and the sealing disk are similar to those previously described and the description thereof is omitted for simplicity.

Figure 6:
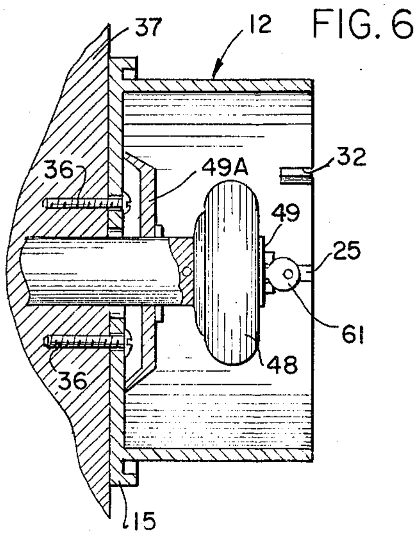
FIG. 6 shows an installation of the invention on a door knob having a key receiving plug so that the entire device is covered.

Upon reference to FIG. 6 a door knob 48 having a tumbler key plug 49 therein controls the door 37 and a face plate 49A covers the attaching screws 36 for the first housing 12, the face plate 49A providing additional retaining means for the first housing. It will be apparent that the second housing 16 and the sealing disk is used with the structure of FIG. 6 to make a secure detection device to show any access to the door knob 48 and/or the key plug 49.

Figure 7:
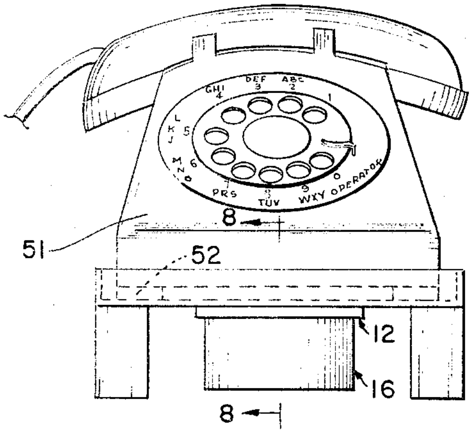
FIG. 7 is a front elevation of a telephone equipped with the protective sealing device of the present invention.
Figure 8:
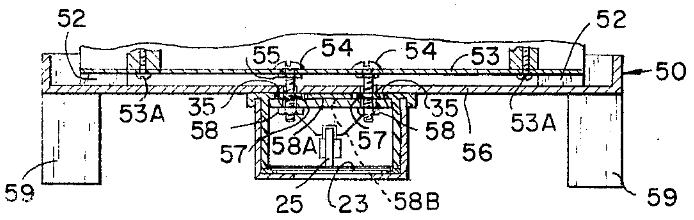
FIG. 8 is a section taken on line 8—8 of FIG. 7 showing the mounting of the open top box covering plate and the first housing mounted thereon.

In security matters it has happened that the telephones have been tampered with to prevent disconnection from the line upon placing the telephone on the hook. The mouthpiece then acts a microphone permitting any wire tapper to hear every word spoken in the room. To prevent such tampering from occurring without detection an open top box 50 FIGS. 7 and 8 of a size to receive the entire base 51 including the supporting feet 52 of a telephone is mounted beneath and secured to the access door 53 of the telephone covering the usual access door retaining screws 53A. Two bolts 54 pass through openings in the door plate 53 adjacent the center thereof and are retained in position on the access door by nuts 55. The bolts 54 pass through registering openings in the bottom 56 of the open top box 50 and such open top box is secured to bolts 54 and to access door 53 by additional nuts 57 of a size to be received in openings 35 of housing 12. The nuts 57 register with and are received in the openings 35 in a first housing 12 which is similar to that previously described so that a single type of housing 12 can be used in many different situations without requiring an excessive number of sizes. The housing 12 is secured to the bolts 54 by means of nuts 58 which are secured in place against a retaining disk 58A having apertures registering with bolts 54 and apertures 35 after it has been determined that the telephone is in safe security operating condition.

The open top box 50 has legs 59 secured thereto at the corners adjacent the conventional feet 52 of the telephone 51 to support the telephone above a supporting surface a distance slightly greater than the overall height of the housings 12 and 16 so that the sealing disk membrane will be protected in normal use of the telephone on a flat surface. Since only authorized personnel are to use the telephone it is believed advantageous to have the membrane unprotected so that any careless handling will be readily observable.

It will be apparent that the bottom of the open top box 50 is spaced from some portions of the telephone access door 53 and this is desirable where downward projecting portions of the door might prevent snug engagement. To accommodate different makes of telephones the open top box is made of a size to fit the usual sizes of telephones without requiring separate open top boxes for each telephone which may be used in the various locations where security must be maintained. It will also be apparent that the open top box may be applied directly against the plate 53 where such plate is of a shape corresponding to the inside shape of the bottom of the open top box. The feet 52 of the telephone may be removed to permit this snug arrangement of the open top box with respect to the telephone. The open top box is made of tempered glass to assure that any tampering will be observed by damage to the box or the seal.

If desired a cover can be provided for covering the lower end of the housings 12 and 16 so that there will be no danger of unintentionally rupturing the sealing membrane 23.

It will thus be seen that this open top box structure can be used with any closure and frame whether such closure and frame is a telephone access plate and telephone chassis or any door and its door frame, and the structure can be used in many different applications where it is desired to know whether access has been had to the interior of a safe, a building, a telephone or any other structure.

Figure 9:
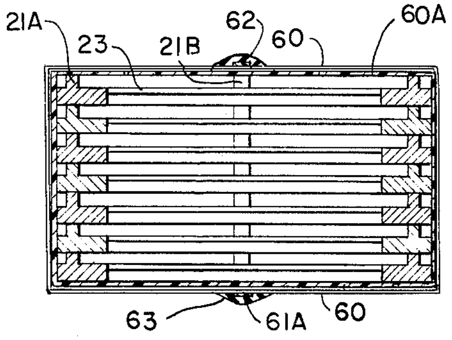
FIG. 9 is a section through a sealed package of one week supply of sealing disks.

A week supply of sealing disks 21 is shown in FIG. 9 showing how a series of disks for a definite period would be supplied in a sealed package with identifying data on the disk including indicia on the membrane which can be read through the preferably transparent membrane and the printing is preferably on the inner surface of such membrane to assure that the indicia cannot be tampered with.

To assure that such disks are furnished properly without any chance of duplication thereof and without any possibility of some disks being removed from a shipment the supply for a definite period such as a week are packaged in a sealing covering 60A which is held in place by strand members 60 which cross strand members 61A and are sealed together by a seal 62 at the top and a seal 63 at the bottom such as lead seals or wax seals with suitable identifying indicia thereon.

The index plate 11 and face plates 44 and 49A are shown as being of a size to clear the inward projections of the latches 25. The plate disk 58A is shown of a diameter to substantially cover the bottom 13 of the first housing and notches 58B are provided in the plate disk 58A to clear such latches. Similarly each of face plates 44, and 49A and the index plate 11 may be of a size to cover the bottom 13 and the flanges or index plate notched similarly to notches 58B to permit assembly.

The sealing disk is made of a solid rim of plastic or other suitable material and the membrane is preferable under stress in the manufacture and under further stress by the action of rib 20 engaging the outer surface of the membrane so that any tampering with the membrane will cause the membrane to become ruptured and thereby indicate that tampering has occurred. The membrane is marked on its inner surface with the date on which it is to be used, and a sufficient number of sealing disks are furnished to the responsible person to last for the period to be covered. Extra sealing disks of a distinctly different color from the dated disks are furnished to the responsible person so that the responsible person will always know the situation of the security of the safe protected with the sealing unit of the present invention.

It will be apparent that a plurality of lugs 31 in housing 16 and corresponding slots in housing 12 can be provided to make a distinctive pattern so that the sealing disks and the housings can be used only with the specific unit and cannot be used with different units thereby assuring that it will be practically impossible to use sealing disks from one sealing unit on another sealing unit.

It will be apparent that changes can be made within the scope of the invention as covered by the valid interpretation of the appended claims.

What is claimed is:

1. A tamper indicating sealed casing for locks comprising a first hollow housing substantially closed at one end and open at the other end, means to mount said closed end of said first housing beneath a portion of the lock supporting structure whereby said first housing cannot be removed without removing a substantial portion of the lock structure, means providing passages through said closed end of first housing, a second cylindrical housing open at one end and partially closed at the other end telescopingly receiving the open end of the first housing a sealing disk positioned between the open end of the first housing and abutting the partial closure of said second housing, interengaging projection and recesses on said first and second housings and said sealing disk for limiting the mounting of said housing members in definite positions and permitting complete telescoping and closing of the housing members only when the proper combination or projections and recesses are properly located, said partially closed end of said second housing being provided with a continuous rib engaging the sealing member of the disk to additionally tension the seal whereby limited physical engagement with the seal after assembly will rupture the seal making such tampering readily noticeable to the observer of the device at a later time, and releasable means operable only from the interior of the housings for retaining the cylindrical housings in assembled relation.

2. A security maintaining structure comprising a safe having a door movable thereon, a combination lock mounted on said door and including an index and mounting face plate, a first housing having one end closed with the closed end in position against said door, means securing said index mounting face plate against the inner surface of said closed end of said first housing retaining said first housing against removal from the door, a combination lock operating dial and bolt operating handle mounted on said face plate and located in said first housing, a sealing disk positioned against the open end of said first housing, a second housing mounted on said first housing and securing said sealing disk in position, and mean operable from the interior of said first housing for releasing said second housing from said first housing permitting access to said dial and bolt operating handle.

3. Seal structure comprising a rim having at least one notch in the outer periphery thereof, a rupturable membrane within said rim completely closing the rim in the central portion thereof, a rib on one surface of said rim for reception in a portion of a housing with which the seal structure is to be used, and slots in the rib for cooperation with indexing means in the housing to prevent unauthorized use of the sealing structure.

4. The invention according to claim 2 in which the first housing is provided with a viewing aperture in the line of sight with the index whereby the person operating the combination is the only person who can see the combination.

5. A tamper indicating sealed casing for security retaining structure comprising a first hollow housing substantially closed at one end and open at the other end, means to mount said closed end of said first housing beneath a portion of the security retaining structure whereby said first housing cannot be removed without removing a substantial portion of the security retaining structure, passage means through said closed end of said first housing through which a portion of the security retaining structure extends, a second housing of frangible material open at both ends and telescopingly receiving substantially all of the first housing, destructible sealing means closing the other end of said second housing preventing access into said housings, and releasable means operable only from the interior of the housings for retaining the frangible housing in assembled relation with said first housing so access cannot be obtained to the interior of said first housing except by destruction of said second housing or said sealing means.

6. The invention according to claim 5 in which a rim is provided around the periphery of the closed end of said first housing and a groove is provided in said rim into which groove the open end of said second housing is snugly received.

7. A tamper indicating healed casing for security retaining structure comprising a first hollow housing substantially closed at one end and open at the other end, means to mount said closed end of said first housing beneath a portion of the security retaining structure whereby said first housing cannot be removed without removing a substantial portion of the security retaining structure, passage means through said closed end of said first housing through which a portion of the security retaining structure extends, a second housing open at one end for telescopingly receiving the first housing, rupturable means closing the other end of said second housing, an outwardly extending rim around the closed end of said first housing and having a groove opening toward the open end of said first housing for receiving the open end of the second housing, and releasable means operable only from the interior of the first housing for releasably retaining the second housing in assembled relation with the first housing.

References Cited by the Examiner

UNITED STATES PATENTS

| | | | |
|---|---|---|---|
| Re. 4,872 | 4/72 | Brooks | 292—307.1 |
| 164,800 | 6/75 | Brooks | 292—407 |

FOREIGN PATENTS

| | | |
|---|---|---|
| 534,096 | 2/41 | Great Britain. |

ALBERT H. KAMPE, *Primary Examiner.*